United States Patent [19]
Kamei et al.

[11] Patent Number: 5,918,067
[45] Date of Patent: Jun. 29, 1999

[54] MULTISTAGE FRONT END PROCESSOR SYSTEM WHICH USES EITHER A STAND-ALONE PRE-PROCESSOR OR A COMPOSITE PRE-PROCESSOR COMPOSED OF SERIALLY CONNECTED STAND-ALONE PROCESSORS

[75] Inventors: Shinichiro Kamei; Kenji Satoh, both of Tokyo, Japan

[73] Assignee: NEC Corporation, Tokyo, Japan

[21] Appl. No.: 08/916,208

[22] Filed: Aug. 22, 1997

[30] Foreign Application Priority Data

Aug. 28, 1996 [JP] Japan .................................... 8-245591

[51] Int. Cl.⁶ .................................................... G06F 13/14
[52] U.S. Cl. ............................ 395/825; 395/853; 395/858
[58] Field of Search ........................... 345/471; 365/201; 395/825, 853, 858; 704/220; 707/104, 530

[56] References Cited

U.S. PATENT DOCUMENTS

| | | | |
|---|---|---|---|
| 4,975,957 | 12/1990 | Ichikawa et al. | 704/220 |
| 5,596,537 | 1/1997 | Sukegawa et al. | 365/201 |
| 5,680,520 | 10/1997 | Watanabe et al. | 345/471 |
| 5,715,453 | 2/1998 | Stewart | 707/104 |
| 5,765,179 | 6/1998 | Sumita et al. | 707/530 |

FOREIGN PATENT DOCUMENTS 6236399  8/1994  Japan .

*Primary Examiner*—Thomas C. Lee
*Assistant Examiner*—Chien Yuan
*Attorney, Agent, or Firm*—Sughrue, Mion, Zinn, Macpeak & Seas, PLLC

[57] ABSTRACT

A multistage front end processor system combining a plurality of front end processors serially for executing complicated pre-processing. The plurality of stand-alone front end processors (6-1 to 6-n) are programs such as a penned character recognition program and a kana-kanji conversion program. A definition information storage module (7) may contain definition information on a composite front end processor composed of a plurality of stand-alone front end processors connected serially. A control module (9) references a definition information storage module (7) and, when a composite front end processor to be started is composed, for example, of a first-stage and a second-stage stand-alone front end processors (6-1, 6-2), sends data entered from an input device 1 to the first-stage stand-alone front end processor (6-1), sends its output to the second-stage stand-alone front end processor (6-2), and sends its output to an application program 10.

12 Claims, 8 Drawing Sheets

71 — FEP1 = PEN.sys
72 — FEP2 = KANAKANJI.sys
73 — FEP3 = JETRANS.exe
74 — FEPseq1 = KANAKANJI.sys ; JETRANS.exe
75 — FEPseq2 = PEN.sys ; KANAKANJI.sys ; JETRANS.exe
76 — CURRENT = FEPseq2

FIG. 2

71 — FEP1 = PEN.sys
72 — FEP2 = KANAKANJI.sys
73 — FEP3 = JETRANS.exe
77 — FEP4 = ONSEININSHIKI.exe
74 — FEPseq1 = KANAKANJI.sys ; JETRANS.exe
75 — FEPseq2 = PEN.sys ; KANAKANJI.sys ; JETRANS.exe
78 — FEPseq3 = ONSEININSHIKI.exe ; KANAKANJI.sys ; JETRANS.exe
76 — CURRENT = FEPseq3

71 — FEP1 = PEN.sys
72 — FEP2 = KANAKANJI.sys
73 — FEP3 = JETRANS.exe
77 — FEP4 = ONSEININSHIKI.exe
74 — FEPseq1 = KANAKANJI.sys ; JETRANS.exe
75 — FEPseq2 = PEN.sys ; KANAKANJI.sys ; JETRANS.exe
78 — FEPseq3 = ONSEININSHIKI.exe ; KANAKANJI.sys ; JETRANS.exe
76 — CURRENT = FEPseq1
79 — DISPLAY = JETRANS.exe

FIG. 8(c) THIS SYSTEM TRANSLATES JAPANESE INTO ENGLISH.

MULTISTAGE FRONT END PROCESSOR SYSTEM WHICH USES EITHER A STAND-ALONE PRE-PROCESSOR OR A COMPOSITE PRE-PROCESSOR COMPOSED OF SERIALLY CONNECTED STAND-ALONE PROCESSORS

BACKGROUND OF THE INVENTION

1. Field of the Invention

The present invention relates to a front end processor system, and more particularly to a multistage front end processor system in which a plurality of front end processors, each with its own function, are connected serially.

2. Related Art

The operating system of a computer has a front end processor system which performs pre-processing on data received from an input device, such as a keyboard, before sending the data to an application program.

The user has an option of specifying the function of a pre-processing program to be used as a front end processor system. Conventionally, because only one program may be specified as a front end processor system for use with an application program, a frequently-used program, such as a kana-kanji conversion program, is usually assigned as a front end processor system. As its name implies, the kana-kanji conversion program converts Roman character strings or kana character strings, entered from a keyboard, into Japanese character strings composed of kanji and kana characters.

Recently, a computer accepts not only coded characters from the keyboard but also many other types of data. For example, as hand-written characters are recognized more precisely, the computer now accepts penned characters written with a pen for entering hand-written characters. This requires that a hand-written character recognition program, specifically designed for recognizing hand-written characters, be assigned as a front end processor system. Another example is a voice recognition program. As voices are recognized more precisely, the computer now accepts human voices directly. This requires that a voice recognition program, specifically designed for recognizing human voice data and converting it into character code symbols, be assigned as a front end processor system.

On the other hand, an attempt is being made to implement a word processor which executes a Japanese-English machine translation program immediately after the execution of a kana-kanji conversion program, as disclosed in Japanese Patent Application No. JP-A-Hei 6-236399. To implement this type of function as a front end processor system, a program which performs kana-kanji conversion and then translates resulting data from Japanese to English must be assigned as a front end processor system instead of a single-function program such as a kana-kanji conversion program and a Japanese-English machine translation program.

SUMMARY OF THE INVENTION

As a computer becomes more sophisticated and finds more uses, pre-processing required for a front end processor system becomes more diversified and complicated. And, the conventional front end processor system, which allows only one program to be assigned as described above, can perform only one type of pre-processing. Therefore, there has been a long felt need for a front end processor system which can execute various types of pre-processing.

In view of the foregoing, it is an object of the present invention to provide a multistage front end processor system which performs not only conventional standalone pre-processing, such as kana-kanji conversion and penned character recognition, but also complex pre-processing by combining those types of processing serially.

Further objects will become apparent from the entire disclosure.

To achieve the above objects, a multistage front end processor system according to the present invention is adapted to be incorporated in an operating system of a computer and performs pre-processing on data, entered from an input device, according to a user's instruction before sending pre-processed results to an application program, the multistage front end processor system comprising:

a plurality of stand-alone front end processors;

a definition information storage module for storing definition information of the front end processors;

a start object specification module; and control means for controlling the front end processors with reference to the definition information storage module.

The definition information storage module stores definition information on a stand-alone front end processor and on a composite front end processor composed of a plurality of stand-alone front end processors connected serially in multiple stages.

The start object specification module receives, from the user (i.e., according to the user's instruction), start object specification information specifying a stand-alone front end processor or a composite front end processor to be started and stores the start object specification information specifying an object to be started into the definition information storage module.

Generally, the control means control the front end processors with reference to said definition information storage module and, when a stand-alone front end processor is selected as a start object, sends data received from the input device to the stand-alone front end processor and sending the output of the stand-alone front end processor to the application program, or, when a composite front end processor is selected as a start object, sends data entered from the input device to the composite front end processor, where the control means sequentially sends an output of a stand-alone front end processor to a next-stage stand-alone front end processor thereafter, and finally sending an output of a last-stage stand-alone front end processor to the application program.

Typically, the control means for referencing the definition information storage module and, when the start object is a stand-alone front end processor, sending data received from the input device to the stand-alone front end processor and sending the output of the stand-alone front end processor to the application program, or, when the start object is a composite front end processor, sending data entered from the input device to a first-stage front end processor of the composite front end processor, sending the output of the first-stage stand-alone front end processor to a second-stage stand-alone front end processor, sequentially sending the output of a stand-alone front end processor to the next-stage stand-alone front end processor thereafter, and finally sending output of a last-stage stand-alone front end processor to the application program.

Also, the multistage front end processor system according to the present invention further comprises a definition information change module for changing definition information, stored in the definition information storage module, according to a user's instruction.

In addition, the multistage front end processor system according to the present invention further comprises an output specification module for storing output specification information indicative of a stand-alone front end processor, whose output is to be displayed, in the definition information storage module, wherein the control means displays the output of the stand-alone front end processor specified by the output specification information stored in the definition information storage module.

PREFERRED EMBODIMENTS

As stand-alone front end processor systems, any program capable of running singly may be used. Such programs include a kana-kanji conversion program, penned (handwritten) character recognition program, and, e. g. Japanese-English (or English-Japanese or else) machine translation program etc. Definition information on a stand-alone front end processor, stored in the definition information storage module, indicates of what kind of program the stand-alone front end processor is made up.

On the other hand, definition information on a composite front end processor indicates what kinds of stand-alone front end processors make up, the composite front end processor as well as the sequence in which they are connected serially. Any program may be assigned as a first-stage stand-alone front end processor of the composite front end processor which can receive an input signal from the input device, process it, and output the result. Any program may be assigned as a stand-alone front end processor of the second-stage or thereafter which can receive the output of a previous stage, process the output, and output the result. For example, the first-stage stand-alone front end processor is a voice recognition program which recognizes human voices and converts them to character code data, the second-stage stand-alone front end processor is a kana-kanji conversion program which receives the resulting character code data of the first-stage front end processor and converts it to kanji data, and the third-stage stand-alone front end processor is a Japanese-English machine translation program which translates Japanese character strings to English character strings. Defining a composite front end processor like this generates a front end processor system which performs a sequence of processing: voice recognition, kana-kanji conversion, and Japanese-English machine translation.

The user can send an instruction to the start object specification module to set (store) start object specification information, specifying a stand-alone front end processor or composite front end processor to be started, in the definition information storage module. Thereafter, the multistage front end processor system according to the present invention functions as the stand-alone front end processor or the composite front end processor that has been specified as the start object. Of course, changing the start object allows the system to function as another stand-alone front end processor or another composite front end processor.

When the start object is a stand-alone front end processor, the control means feeds data received from the input device to the stand-alone front end processor and sends its output to the application program. When the start object is a composite front end processor, the control means feeds data received from the input device to the first-stage stand-alone front end processor, sends its output to the second-stage stand-alone front end processor, sequentially sends the output of the previous-stage stand-alone front end processor to the next-stage stand-alone front end processor thereafter and, finally, sends the output of the last-stage stand-alone front end processor to the application program.

The user may send an instruction to the definition information change module to change definition information on front end processors, including composite front end processors etc., stored in the definition information storage module. This allows the user to add a new composite front end processor or to change the definition information on an already-defined composite front end processor (For example, the user may add, delete or change any of stand-alone front end processors of a composite front end processor, or change the connection sequence, etc.).

In addition, the user may send an instruction to the output specification module to specify a front end processor whose output is to be displayed. This output specification information is stored in the definition information storage module. When the start object is a composite front end processor composed of a plurality of stand-alone front end processors, the control means displays the output of only those stand-alone front end processors for which output specification information has been specified in the definition information storage module. This allows the user to display the output of a stand-alone front end processor in any given stage of a composite front end processor.

BRIEF DESCRIPTION OF THE DRAWINGS

FIG. 2 is a diagram showing an example of contents contained in a definition information storage module.

FIG. 4 is a diagram showing an example of a definition information storage module to which definition information on a stand-alone front end processor and a composite front end processor has been added.

FIG. 6 is a diagram showing another example of contents contained in a definition information storage module.

FIG. 8 is a diagram showing an example of output from each of the stand-alone front end processors constituting a composite front end processor.

DETAILED DESCRIPTION OF THE PREFERRED EMBODIMENTS

In the following, preferred embodiments will be described in more detail with reference to the drawings which serve merely for better illustration of the invention.

Referring to the attached drawings, there is shown a preferred embodiment of the present invention.

Figure 1:
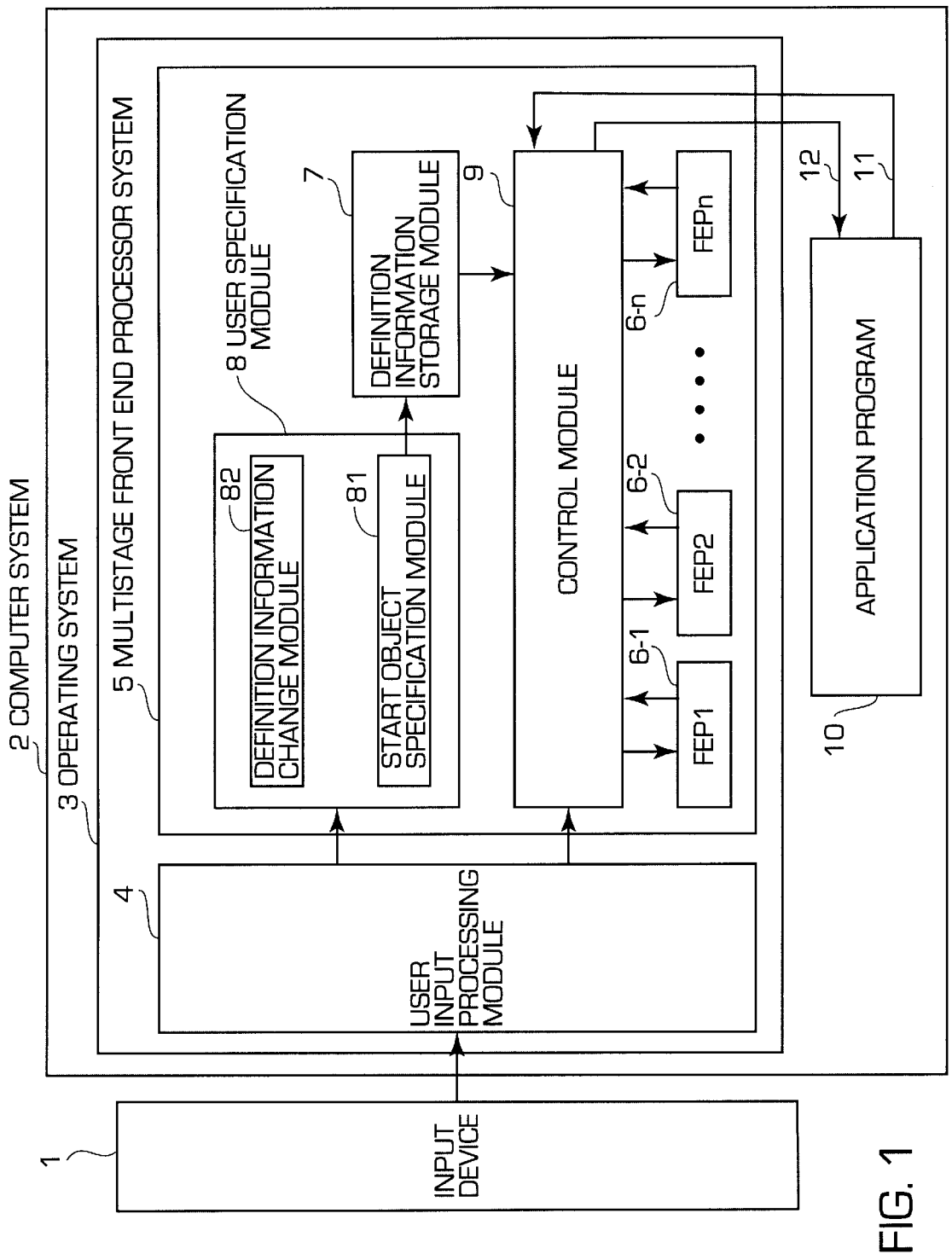
FIG. 1 is a block diagram showing an embodiment of the present invention.

As shown in FIG. 1, a multistage front end processor system 5 used in an embodiment of the present invention comprises a plurality of front end processors (FEP1–FEPn) 6-1 to 6-n each capable of executing its own function alone, definition information storage module 7, user specification module 8 which has a start object specification module 81 and a definition information change module 82, and a control module 9 responsible for the overall control of the multistage front end processor system 5. The multistage front end processor system 5 is incorporated in and runs under an operating system 3 of a computer system 2. In FIG. 1, number 1 refers to an input device comprising such units as a keyboard, voice input microphone, and pen for entering hand-written characters, number 4 refers to a user input processing module which is contained in the operating system 3 and which sends data from the input device 1 to the multistage front end processor system 5, and number 10 refers to an application program residing in the operating system 3.

Each of stand-alone front end processors, 6-1 to 6-n, capable of executing its own function by itself, performs pre-processing on data passed from the control module 9 and returns the result back to the control module 9. Each of the stand-alone front end processors, 6-1 to 6-n, is formed of a program such as certain kana-kanji conversion program, certain penned character recognition program, and certain Japanese to English machine translation program etc..

The definition information storage module 7 contains definition information on the stand-alone front end processors, 6-1 to 6-n, and on the composite front end processors each composed of a plurality of stand-alone front end processors. FIG. 2 shows an example of information contained in the definition information storage module 7.

In FIG. 2, numbers 71 to 73 refer to an example of the definition information on stand-alone front end processors. Definition information 71 indicates that the stand-alone front end processor FEP1 is a penned character recognition program "PEN.sys", definition information 72 indicates that the stand-alone front end processor FEP2 is a kana-kanji conversion program "KANAKANJI.sys", definition information 73 indicates that the stand-alone front end processor FEP3 is a Japanese-English machine translation program "JETRANS.exe". Definition information on stand-alone front end processors like this is set when the programs are set up for stand-alone front end processors (FEP1–FEPn), 6-1 to 6-n.

On the other hand, definition information 74 and 75 shows an example of definition information on composite front end processors. Definition information 74 indicates that the first composite front end processor FEPseq1 is composed of two serially-connected stand-alone front end processors: kana-kanji conversion program "KANAKANJI.sys" and Japanese-English machine translation program "JETRANS.exe". Definition information 75 indicates that the second composite front end processor FEPseq2 is composed of three serially-connected stand-alone front end processors: penned character recognition program "PEN.sys", kana-kanji conversion program "KANAKANJI.sys" and Japanese-English machine translation program "JETRANS.exe".

Start object specification information 76 indicates a stand-alone front end processor or a composite front end processor currently active. In FIG. 2, CURRENT=FEPseq2 means that the composite front end processor FEPseq2 has been started by the user.

The following explains how the multistage front end processor system 5 used in this embodiment operates:
(1) Specifying an Object to be Started When the start object specification information 76, stored in the definition information storage module 7, contains a stand-alone front end processor or a composite front end processor that is not appropriate for the application program 10 the user is going to start, the user may use a special-key for starting a front end processor, or a combination of a plurality of keys on the input device 1, to specify a stand-alone front end processor or a composite front end processor the user wants to start. More specifically, to start a composite front end processor, the user presses the special key, types a character string identifying one of a plurality of composite front end processors, then presses the special key again. That is, the user presses the special key, types a character string, then types the special key. For example, to start the composite front end processor FEPseq2, the user presses the special key, types character string S2, then presses the special key. On the other hand, to start a stand-alone front end processor, the user presses the special key, types a number identifying one of a plurality of stand-alone front end processors, then presses the special key again. That is, the user presses the special key, types a number, then types the special key. For example, to start the stand-alone front end processor FEP1, the user presses the special key, types number 1, then presses the special key.

The procedure for specifying a start object for the multistage front end processor system 5 does not depend on the type of application program 10 the user is going to start. This standardizes the application program startup procedure, thus increasing operability.

A sequence of key operations (including that on the special key for starting a front end processor) on the input device 1 sends key information to the start object specification module 81 in the user specification module 8 of the multistage front end processor system 5 via the user input processing module 4 of the operating system 3. Upon receiving this information, the start object specification module 81 analyzes the key information and changes the start object specification information 76 contained in the definition information storage module 7, shown in FIG. 2, according to the keys the user pressed. For example, when the user presses the keys in order of "special key, 1, special key," the start object specification module 81 changes the start object specification information 76 to "CURRENT= FEP1". Similarly, when the user presses the keys in order of "special key, S1, special key," the start object specification module 81 changes the start object specification information 76 to "CURRENT=FEPseq1".

(2) Starting the Multistage Front End Processor System 5

The application program 10, when started, sends a start signal 11 to the control module 9 of the multistage front end processor system 5 in the operating system 3. This starts the control module 9 of the multistage front end processor system 5. The control module 9 performs pre-processing on data, which was received from the input device 1 via the user input processing module 4, before sending it to the application program 10.

Figure 3:
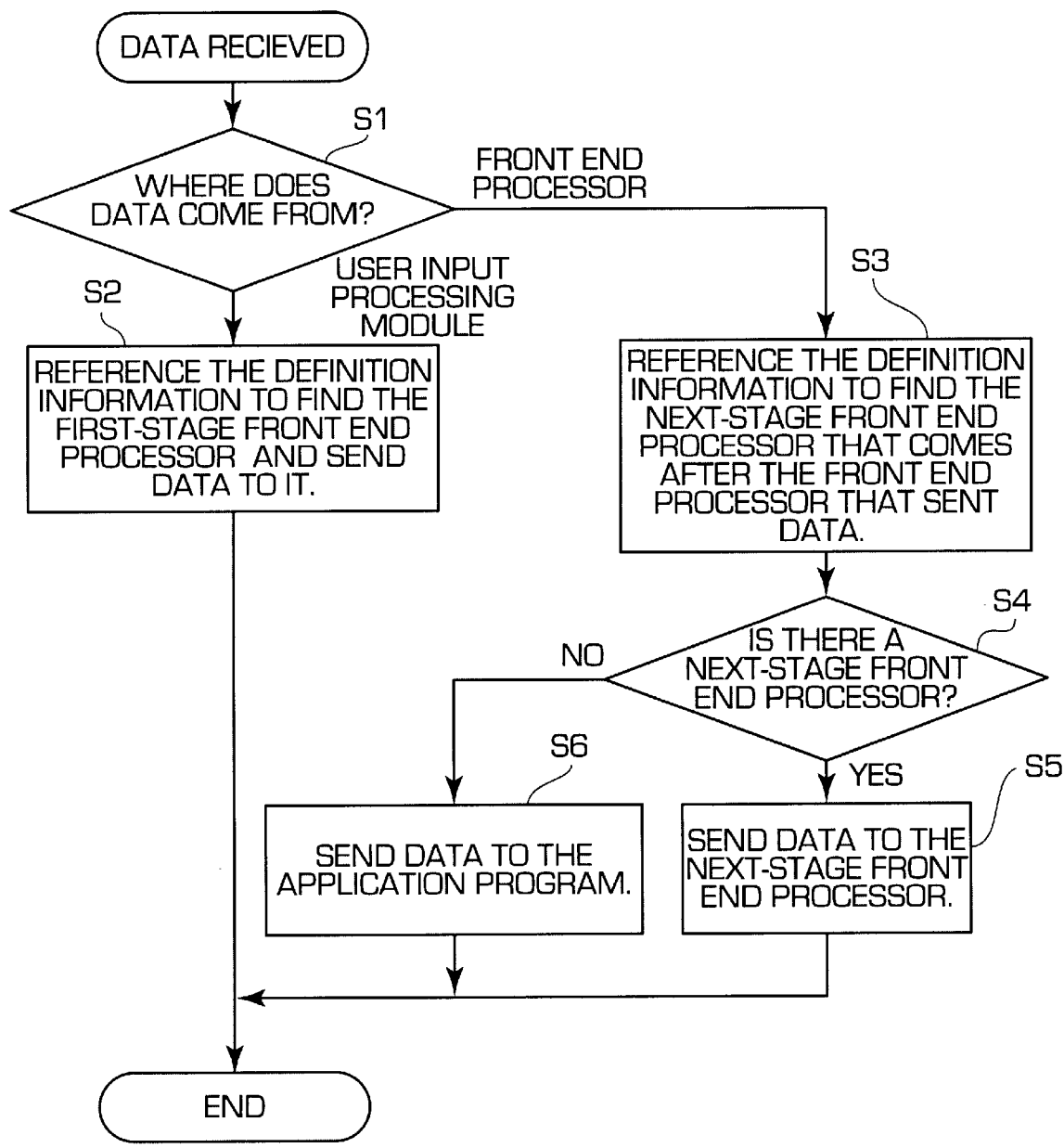
FIG. 3 is a flowchart showing an example of control module processing.

FIG. 3 is a flowchart showing an example of processing executed by the control module 9. The control module 9 executes processing shown in FIG. 3 either when it receives data from the input device 1 via the user input processing module 4 or when it receives data from any of stand-alone front end processors 6-1 to 6-n. First, the control module 9 determines where data has been come from: user input processing module 4 or one of stand-alone front end processors 6-1 to 6-n (step S1). When data comes from the user input processing module 4, the control module 9 references the definition information on the stand-alone front end processor or on the composite front end processor to be started which is stored in the definition information storage module 7. It then sends data entered from the user input processing module 4 to the first-stage front end processor. (step S2)

When data comes from a stand-alone front end processor, the data is the result pre-processed by the stand-alone front end processor which has received data from the control module 9. The control module 9 references the definition information on the stand-alone front end processor or on the composite front end processor to be started which is stored in the definition information storage module 7. The control module 9 checks the definition information to see if there is a next-stage stand-alone front end processor (step S3). If the definition information indicates that there is such a next-stage stand-alone front end processor (YES in step S4), the control module 9 sends the received data to that next-stage front end processor (step S5). If the definition information indicates that there is no such next-stage front end processor (NO in step S4), the control module 9 determines that the current stand-alone front end processor is the last-stage front end processor and sends the returned data to the application program 10 as data 12. (step S6)

Therefore, when the start object is the composite front end processor FEPseq2 as indicated by the start object specification information 76 in FIG. 2, the control module 9 references definition information 75 and sends data entered with a hand-writing entry pen, one of input devices 1, to the penned character recognition program "PEN.sys," the first-stage stand-alone front end processor FEP1 (S1, S2). When the first-stage front end processor FEP1 has processed the data and outputs Roman or hiragana data as a result of hand-written character recognition processing, the control module 9 references the definition information 75 and sends the processed data to the kana-kanji conversion program "KANAKANJI.sys," the second-stage front end processor FEP2 (S1, S3–S5). Next, when the second-stage front end processor FEP2 has processed the data and returns kana-kanji data, the control module 9 references the definition information 75 and sends the returned data to the Japanese-English machine translation program "JETRANS.exe," the third-stage front end processor FEP3 (S1, S3–S5). When the third-stage front end processor FEP3 has processed the data and outputs English data, the control module 9 references the definition information 75, finds that there is no next-stage front end processor, and sends the output from the third-stage stand-alone front end processor FEP3 to the application program 10 (S1, S3, S4, S6).

(3) Changing Definition Information in the Definition Information Storage Module 7

It is desirable that the user specify combination of a plurality of the stand-alone front end processors to be included in a composite front end processor and their sequence within the composite front end processor. For example, a user may require that the first-stage stand-alone front end processor of a composite front end processor be a kana-kanji conversion program and that the second-stage stand-alone front end processor be a Japanese-English machine translation program. Another user may requires that the first-stage stand-alone front end processor be a voice recognition program which recognizes human voices and outputs corresponding voice codes, that the second-stage stand-alone front end processor be a conversion program which converts voice codes to character strings, and that third-stage stand-alone front end processor be a kana-kanji conversion program.

To respond to this need, the multistage front end processor system 5 according to the present invention has the definition information change module 82 which allows the user to change definition information stored in the definition information storage module 7. The definition information change module 82 receives a user instruction from the input device 1 via the user input processing module 4 to allow the user to add a stand-alone front end processor or to add or change the definition information on a composite front end processor. This enables the user to build a composite front end processor to fit his or her needs.

FIG. 4 shows an example of the contents of the definition information storage module 7 to which the user has added a new stand-alone front end processor and in which the user has defined a new composite front end processor. In this figure, numbers 71–76 refer to those contained in FIG. 2, and numbers 77 and 78 refer to new added definition information. Definition information 77 indicates that the user has assigned the voice recognition program "ONSEININSHIKI.exe", which recognizes human voices and outputs the corresponding voice codes, to the stand-alone front end processor FEP4. Definition information 78 is information on a new composite front end processor FEPseq3 which has been added by the user via the definition information change module 82. The new composite front end processor is composed of the voice recognition program "ONSEININSHIKI.exe" as the first-stage stand-alone front end processor, the kana-kanji conversion program "KANA-KANJI.sys" as the second-stage stand-alone front end processor, and the Japanese-English machine translation program "JETRANS.exe" as the third stand-alone front end processor.

Figure 5:
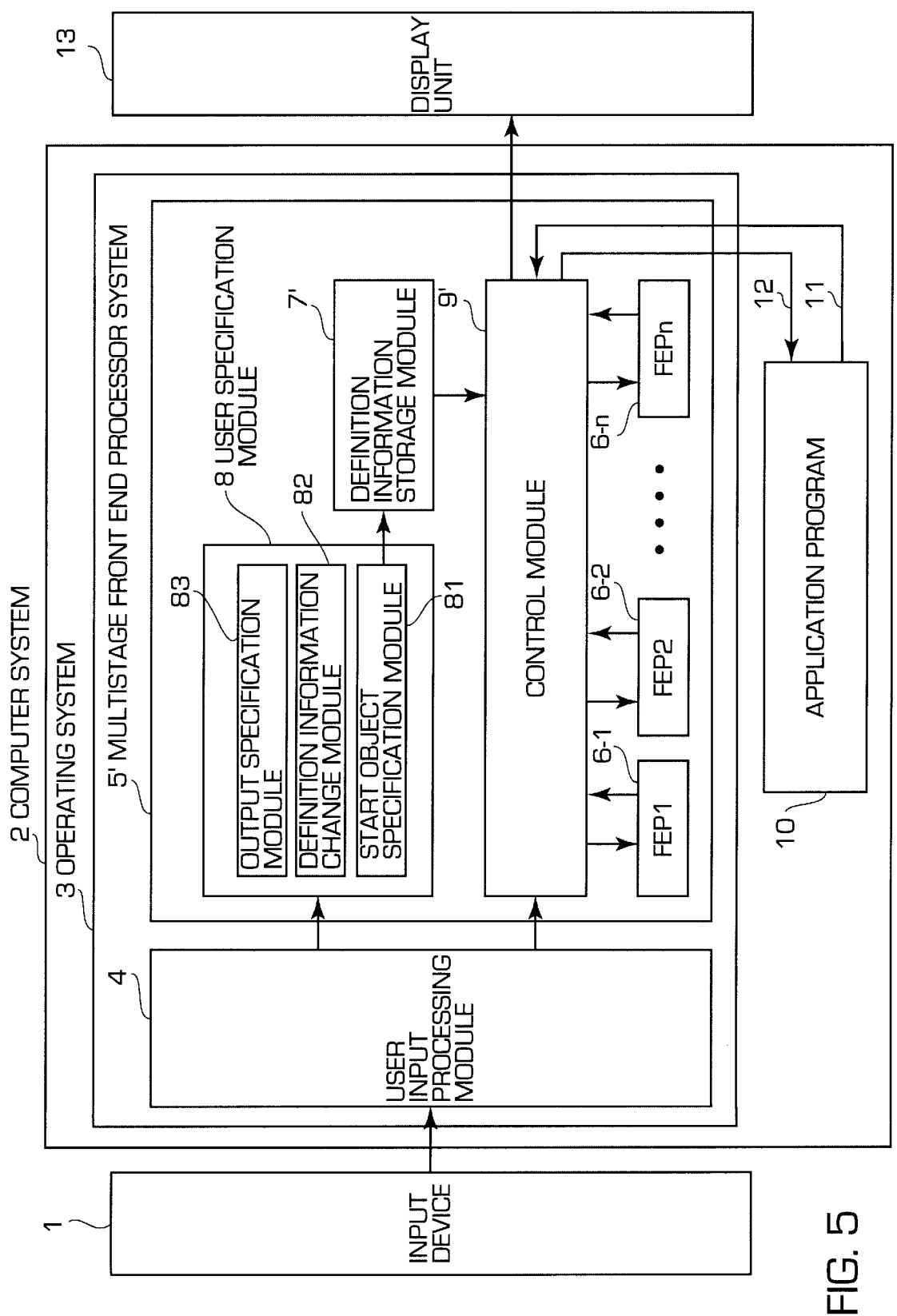
FIG. 5 is a block diagram showing another embodiment of the present invention.

FIG. 5 is a block diagram of a multistage front end processor system 5', another embodiment of the present invention. In this figure, the same numbers as those used in FIG. 1 refer to the same components, number 13 refers to a display unit such as a CRT display, number 83 refers to an output specification module, number 7' refers to a definition information storage module, and number 9' refers to a control module.

As for the composite front end processor composed of a plurality of multistage stand-alone front end processors, it is convenient for the user to be able to determine whether to display the processing results of all the stand-alone front end processors or to display the result of only the selected stand-alone front end processor(s). For example, for a composite front end processor in which the first-stage stand-alone front end processor is a kana-kanji conversion program and the second-stage stand-alone front end processor is a Japanese-English machine translation program for translating Japanese into English, it is desirable that the user be able to select one of two options. The first option displays the processing results of both the first-stage and the second-stage, and the second option does not display the processing results of the kana-kanji conversion program executed in the first stage but displays the processing result of the Japanese-English machine translation program which is executed in the second stage. The second option allows kana-kanji character data, entered in the first stage, to be immediately displayed in the second stage as English.

The output specification module 83 shown in the embodiment in FIG. 5 accepts, from the input device 1 via the user input processing module 4, a user request specifying a stand-alone front end processor whose output is to be displayed, and stores output specification information indicating the user request into the definition information storage module 7'. The control module 9' references this output specification information to determine which stand-alone front end processor's output is to display on a display unit 13.

FIG. 6 shows an example of contents of the definition information storage module 7' to which the user has added an entry specifying, via the output specification module 83, a stand-alone front end processor whose output is to be displayed. In the figure, numbers 71–78 refer to the same components as those shown in FIG. 4, while number 79 refers to the output specification information specified by the user via the output specification module 83. In this example, the user specifies the start object specification information 76 to specify the composite front end processor FEPseq1 composed of two stand-alone front end processors: the kana-kanji conversion program "KANAKANJI.sys" which is the first-stage stand-alone front end processor and the Japanese-English machine translation program "JETRANS.exe" which is the second-stage stand-alone front end processor. After that information, the user also specifies output specification information to be "DISPLAY= JETRANS.exe". This output specification information specifies that only the result of the Japanese-English machine translation program "JETRANS.exe", the last-stage program, be displayed.

The following explains how the multistage front end processor system 5' of this embodiment operates:

(1) Specifying an Object to be Started.

When the start object specification information 76 stored in the definition information storage module 7' contains data of a stand-alone front end processor or a composite front end processor that is not appropriate for the application program 10, the user is going to start, the user changes the start object specification information 76 in the same manner as for the embodiment shown in FIG. 1. In that manner, the user specifies a stand-alone front end processor or a composite front end processor to be started for the application program.

(2) Specifying a Stand-Alone Front End Processor Whose Output is to be displayed When the output specification information 79 stored in the definition information storage module 7' specifies a stand-alone front end processor that is not desired, the user specifies, via the input device 1, that the output specification information 79 be changed and types new output specification information data. The resultant information is passed to the output specification module 83 of the user specification module 8 via the user input processing module 4. Upon receiving this information, the output specification module 83 changes the output specification information 79 as instructed by the user.

(3) Starting the Multistage Front End Processor System 5'

The application program 10, when started, sends a start signal 11 to the multistage front end processor system 5' of the operating system 3. This starts the control module 9' of the multistage front end processor system 5'. The control module 9' performs pre-processing on data, which was sent from the input device 1 via the user input processing module 4, before sending it to the application program 10.

Figure 7:
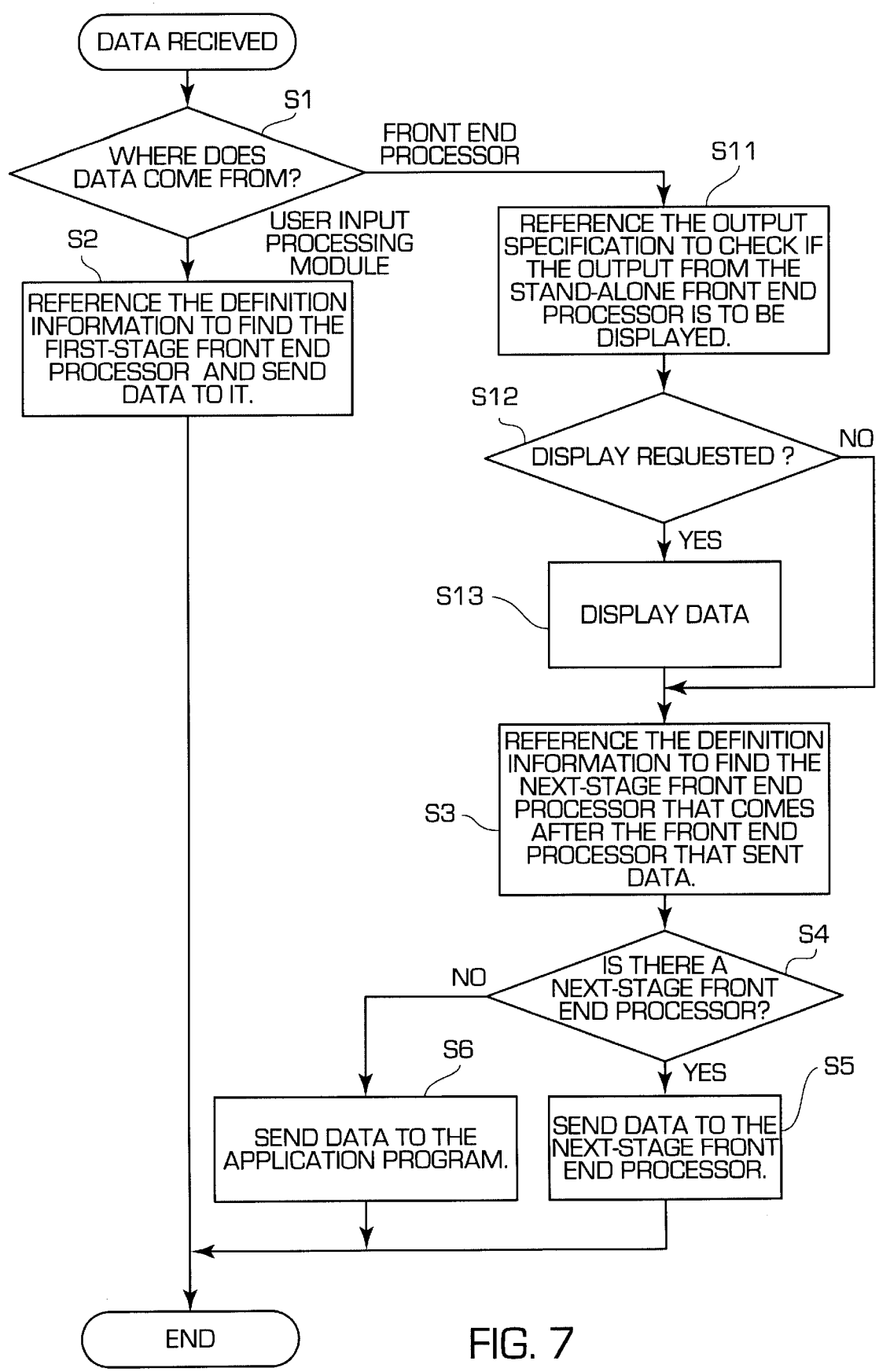
FIG. 7 is a flowchart showing another example of control module processing.

FIG. 7 is a flowchart showing an example of processing executed by the control module 9', with steps S11 to S13 added to the flowchart shown in FIG. 3. The control module 9' executes processing shown in FIG. 7 either when it receives data from the input device 1 via the user input processing module 4 or when it receives data from any of stand-alone front end processors 6-1 to 6-n. First, the control module 9' determines where data has been sent from: user input processing module 4 or one of stand-alone front end processors 6-1 to 6-n (step S1). When data comes from the user input processing module 4, the control module 9' references the definition information on the stand-alone front end processor or on the composite front end processor to be started which is stored in the definition information storage module 7'. It then sends data entered from the user input processing module 4 to the first-stage front end processor. (step S2)

When data comes from a stand-alone front end processor, the control module 9' references the output specification information 79 stored in the definition information storage module 7' to check to see if the output from the stand-alone front end processor is to be displayed (step S11). If the output is to be displayed (YES in step S12), the control module 9' adds the identifier of the source stand-alone front end processor to the entered data and displays the resulting data on the display unit 13 (step S13). The screen of the display unit 13 is designed so that data on each stand-alone front end processor identifier is displayed in its own area on the screen. That is, data from the control module 9' is displayed in an area corresponding to the identifier of each stand-alone front end processor. In addition, when the user requests that the output from the source stand-alone front end processor not be displayed (NO in S12), the control module 9' skips step S13 and does not display the data.

Next, the control module 9' references the definition information on the stand-alone front end processor or on the composite front end processor to be started, which is stored in definition information storage module 7', to see if there is a next-stage stand-alone front end processor (S3). If the definition information indicates that there is such a next-stage stand-alone front end processor (YES in S4), the control module 9' sends the received data to that next-stage front end processor (S5). If the definition information indicates that there is no such next-stage front end processor (NO in S4), the control module 9' determines that the current stand-alone front end processor is the last-stage front end processor and sends the returned data to the application program 10 as data 12. (S6)

The following describes the operation of this embodiment more in detail with the use of an example:

In the example, the user uses the front end processor FEPseq2 composed of three stages: the first-stage stand-alone front end processor is the character recognition program "PEN.sys" which recognizes hand-written image data and converts it to character code data, the second-stage stand-alone front end processor is the kana-kanji conversion program "KANAKANJI.sys" which receives the resulting character code data and converts it to kanji data, and the third-stage stand-alone front end processor is the Japanese-English machine translation program "JETRANS.exe" which translates the resulting Japanese character strings to English character strings. That is, the composite front end processor recognizes Japanese hand-written characters, converts them to kana-kanji data, and then translates the converted results to English. An editor of a word processor is assumed as the application program 10. It is also assumed that the output specification information 79 contains information on all the three stand-alone front end processors described above.

Upon receiving data entered with a hand-writing entry pen, one of input devices 1, via the user input processing module 4, the control module 9' of the multistage front end processor system 5' references the definition information 75 via the start object specification information 76 and sends the entered data to the penned character recognition program "PEN.sys", the first-stage stand-alone front end processor FEP1 (S1, S2). After the first-stage stand-alone front end processor FEP1 processes the received data and generates resulting recognized data in a form such as hiragana data, the control module 9' references the output specification information 79 to check whether to display the recognized data. The result is transmitted to the display unit 13. In case where the output specification information 79 specifies that the data is to be displayed, the control module 9' sends the recognized data to the display unit 13 and, at the same time, references the definition information 75 and sends the recognized data to the kana-kanji conversion program "KANAKANJI.sys", the second-stage stand-alone front end processor FEP2 (S1, S11–S13, S3–S5). Then, after the second-stage stand-alone front end processor FEP2 processes the received data and returns kana-kanji data, the control module 9' references the output specification information 79, sends the kana-kanji data to the display unit 13 and, at the same time, references the definition information 75 and sends the kana-kanji data to the Japanese-English machine translation program "JETRANS.exe", the third-stage stand-alone front end processor FEP3 (S1, S11–S13, S3–S5). And, when the third-stage stand-alone front end processor FEP3 translates the received Japanese character strings into English character strings and outputs the translated result, the control module 9' references the output specification information 79, sends the translated data to the display unit 13 and, at the same time, references the definition information 75. Because there is no next-stage stand-alone front end processor in the definition information 75, the control module 9' outputs the translated result to the application program 10 (S1, S11–S13, S3, S4, S6).

FIG. 8 shows an example of output from the stand-alone front end processor in each stage. FIG. 8(a) shows an example of output from the first-stage hand-written character recognition program. In this example, all the characters are entered in hiragana characters. FIG. 8(b) shows a character string that is output from the second-stage kana-kanji conversion program. In this example, the entered hiragana character string is converted to a kana-kanji Japanese character string. FIG. 8(c) shows an example of output from the third-stage Japanese-English machine translation program.

Although the results of all the stand-alone front end processors of the composite front end processor FEPseq2 are displayed in the above example, the user may display the results of the selected stand-alone front end processors by changing the output specification information 79 as described above. For example, when the user requests that the output of only the Japanese-English machine translation program be displayed, only the translated result (c) in FIG. 8 is displayed.

In the above example, the results of all the stand-alone front end processors of the composite front end processor FEP2 are sequentially displayed without user intervention. It should be noted that the system may be modified so that, when the results of the first-stage hand-written character recognition program (FIG. 8(a)) and the second-stage kana-kanji conversion program (FIG. 8(b)) are displayed, the system asks the user whether to start the Japanese-English machine translation program. It should be noted that a corresponding program embodying the multistage front end processor system may be implemented applying the skill of the art and such program can be recorded is a recording medium or further supplied via any communication means and route.

In the following the meritorious effects of the present invention will be summarized, however, without limitative purpose.

It should be noted that a corresponding program embodying the multistage front end processor system may be implemented applying the skill of the art and such program can be recorded in a recording medium or further supplied via any communication means and route.

As described above, the present invention gives the user the following benefits:

Not only may a system be used as a stand-alone front end processor which performs such operations as kana-kanji conversion or penned character recognition, but also a plurality of stand-alone front end processors may be combined serially to build a composite front end processor.

A configuration with the definition information change module for changing the definition information stored in the definition information storage module according to user's instructions allows the user to build a composite front end processor composed of a plurality of stand-alone front end processors connected in a sequence the user desires.

A further configuration with the output specification module for specifying, in the definition information storage module, the output specification information specifying that the output of a stand-alone front end processor of a composite front end processor be displayed on the display means allows the user to display the output of the specified stand-alone front end processor to check its result.

It should be noted that modifications may be done without departing the gist and scope of the present invention as described and claimed as appended.

What is claimed is:

1. A multistage front end processor system adapted to be incorporated in an operating system of a computer and performing pre-processing on data, entered from an input device, according to a user's instruction before sending pre-processed results to an application program, the multistage front end processor system comprising:

a plurality of stand-alone front end processors;

a definition information storage module which stores definition information on a stand-alone front end processor and on a composite front end processor composed of a plurality of stand-alone front end processors connected serially in multiple stages;

a start object specification module which receives according to the user's instruction, start object specification information specifying a stand-alone front end processor or a composite front end processor to be started and stores the start object specification information specifying an object to be started into said definition information storage module; and control means for referencing said definition information storage module and, when a stand-alone front end processor is selected as a start object, sending data received from the input device to the stand-alone front end processor and sending the output of the stand-alone front end processor to the application program, or, when a composite front end processor is selected as a start object, sending data entered from the input device to a first-stage front end processor of the composite front end processor, sending an output of the first-stage stand-alone front end processor to a second-stage stand-alone front end processor, sequentially sending an output of a stand-alone front end processor to a next-stage stand-alone front end processor thereafter, and finally sending an output of a last-stage stand-alone front end processor to the application program.

2. A multistage front end processor system as defined in claim 1, further comprising a definition information change module for changing definition information, stored in said definition information storage module, according to a user's instruction.

3. A multistage front end processor system as defined in claim 1, further comprising an output specification module for storing output specification information on a processor whose output is to be displayed into said definition information storage module, wherein said control means displays the output of a stand-alone front end processor specified by the output specification information stored in said definition information storage module.

4. A multistage front end processor system as defined in claim 2, further comprising an output specification module for storing output specification information on a processor whose output is to be displayed into said definition information storage module, wherein said control means displays the output of a stand-alone front end processor specified by the output specification information stored in said definition information storage module.

5. A multistage front end processor system adapted to be incorporated in an operating system of a computer and performing pre-processing on data, entered from an input device, according to a user's instruction before sending pre-processed results to an application program, the multistage front end processor system comprising:

a plurality of stand-alone front end processors;

a definition information storage module which stores definition information on a stand-alone front end processor and on a composite front end processor composed of a plurality of stand-alone front end processors connected serially in multiple stages;

a start object specification module which receives according to the user's instruction, start object specification information specifying a stand-alone front end processor or a composite front end processor to be started and stores the start object specification information specifying an object to be started into said definition information storage module; and control means for controlling the front end processors with reference to said definition information storage module and, when a stand-alone front end processor is selected as a start object, sending data received from the input device to the stand-alone front end processor and sending the output of the stand-alone front end processor to the application program, or, when a composite front end processor is selected as a start object, sending data entered from the input device to the composite front end processor, said control means sequentially sending an output of a stand-alone front end processor to a next-stage stand-alone front end processor thereafter, and finally sending an output of a last-stage stand-alone front end processor to the application program.

6. A multistage front end processor system as defined in claim 5, further comprising a definition information change module for changing definition information, stored in said definition information storage module, according to a user's instruction.

7. A multistage front end processor system as defined in claim 5, further comprising an output specification module for storing output specification information on a processor whose output is to be displayed into said definition information storage module, wherein said control means displays the output of a stand-alone front end processor specified by the output specification information stored in said definition information storage module.

8. A multistage front end processor system as defined in claim 6, further comprising an output specification module for storing output specification information on a processor whose output is to be displayed into said definition information storage module, wherein said control means displays the output of a stand-alone front end processor specified by the output specification information stored in said definition information storage module.

9. A computer having the multistage front end processor system as defined in claim 1.

10. A computer having the multistage front end processor system as defined in claim 5.

11. A recording medium storing a program representing the multistage front end processor system as defined in claim 1.

12. A recording medium storing a program representing the multistage front end processor system as defined in claim 5.

* * * * *

UNITED STATES PATENT AND TRADEMARK OFFICE
CERTIFICATE OF CORRECTION

PATENT NO. : 5,918,067
DATED : June 29, 1999
INVENTOR(S) : Shinichiro KAMEI and Kenji SATOH It is certified that error appears in the above-identified patent and that said Letters Patent is hereby corrected as shown below:

Column 4, line 62, delete "module7" and insert --module 7--.

Signed and Sealed this

Twenty-fifth Day of January, 2000

Attest:

Attesting Officer

*Acting Commissioner of Patents and Trademarks*